US005937149A

United States Patent [19]

Lindner et al.

[11] Patent Number: 5,937,149

[45] Date of Patent: Aug. 10, 1999

[54] SYSTEM FOR CONTROLLING THE AUTOMATED PRINTING PLATE CHANGE PROCESS IN PRINTING MACHINES

[75] Inventors: Bernd Lindner, Heusenstamm; Dieter Duschl, Offenbach, both of Germany

[73] Assignee: MAN Roland Druckmaschinen AG, Germany

[21] Appl. No.: 08/926,715

[22] Filed: Sep. 10, 1997

[30] Foreign Application Priority Data

Sep. 10, 1996 [DE] Germany ........................... 196 36 703

[51] Int. Cl.[6] ........................ G06F 15/00

[52] U.S. Cl. ........................ 395/113

[58] Field of Search ........................ 395/12, 101, 102, 395/104, 105, 108, 111, 113, 117, 200.31, 185.01, 185.02, 185.04; 345/146, 156, 501, 520, 522, 115, 116, 117, 133, 347, 348, 352; 707/102, 526; 101/450.1, 453, 463.1; 399/18, 81

[56] References Cited

U.S. PATENT DOCUMENTS

| | | | |
|---|---|---|---|
| 4,437,403 | 3/1984 | Greiner | 101/248 |
| 5,111,744 | 5/1992 | Wieland | 101/216 |
| 5,289,775 | 3/1994 | Spiegel et al. | 101/477 |
| 5,307,420 | 4/1994 | Fujino et al. | 382/152 |
| 5,377,319 | 12/1994 | Kitahara et al. | 345/337 |
| 5,454,317 | 10/1995 | Kobler et al. | 101/477 |
| 5,479,859 | 1/1996 | Lindner et al. | 101/485 |
| 5,634,406 | 6/1997 | Lindner et al. | 435/325 |
| 5,734,804 | 3/1998 | Bergner | 395/113 |
| 5,813,333 | 9/1998 | Ohno | 101/181 |

FOREIGN PATENT DOCUMENTS

| | | |
|---|---|---|
| 39 40 796 C2 | 9/1991 | Germany . |
| 4130359 | 3/1993 | Germany . |
| 94 11 254 | 11/1994 | Germany . |
| 43 38 664 C2 | 9/1995 | Germany . |
| 44 39 623 A1 | 5/1996 | Germany . |

*Primary Examiner*—Scott Rogers
*Assistant Examiner*—Gabriel I. Garcia
*Attorney, Agent, or Firm*—Leydig, Voit & Mayer, Ltd

[57] ABSTRACT

A system is disclosed for controlling the automated printing plate change process in a printing machine, especially a sheet-fed offset printing machine having one or more printing units, wherein each printing unit includes a device for automatically changing the printing plate. The system allows the printing plate change process to be monitored by an operator from a central work location. According to the invention, a human-machine interface computer evaluates the signals transmitted by the control system in order to gather information which is displayed on a visual display device. The human-machine interface then displays the individual stages or working steps of the printing plate change process in the form of graphical user interface icons. Also displayed are the location and type of fault that occur during the plate change process.

9 Claims, 5 Drawing Sheets

SYSTEM FOR CONTROLLING THE AUTOMATED PRINTING PLATE CHANGE PROCESS IN PRINTING MACHINES

FIELD OF THE INVENTION

The invention relates generally to printing machines, and more particularly to a system for controlling automated printing plate change processes in printing machines.

BACKGROUND OF THE INVENTION

Printing machines, particularly sheet-fed offset printing machines, increasingly utilize partially or completely automated printing machine plate changers. During a plate change process, a used printing plate in a printing unit is removed from a plate cylinder and a new printing plate required for the next print job is forwarded onto the plate cylinder. In offset printing machines, where printing units are constructed in series, the printing plate changers are included either as separate devices, upstream or downstream from the printing unit, or they are integrated into the printing unit.

In conventional printing machines, these automated printing plate changers comprise the delivery means for conveying a new printing plate onto the plate cylinder from a storage chamber or magazine, as well as the appropriate means for removing the used printing plate from the plate cylinder and conveying the plate into the storage chamber or magazine. In addition, the automated printing plate changers are coupled to a control system which allows the plate change process in each printing unit to be executed in a pre-programmed manner. The control system, in addition to controlling the conveyance of the printing plate, controls the positioning of the individual printing units and the printing machine in order to correctly align the print cylinders. The control system is further connected to actuators necessary for clamping and tensioning the printing plates located on the plate cylinder. Through the use of interrogatable position sensors, progress of the automated printing plate change process is monitored by the control system along with successively executing the working steps necessary to complete the change process.

Disclosed in U.S. Pat. No. 5,111,744 (and corresponding German Patent DE 3 940 796 C2) is a method and a device for automatically changing printing plates in a printing machine. This device comprises the components described above, such as the actuators for clamping and tensioning the printing plate located on the printing cylinder, the conveying means for conveying the printing plate to and from the printing cylinder, a control system coupled to the printing machine used to position the plate cylinders, and position sensors for controlling the working steps required to complete the plate change process.

German Patent DE 9 411 254 U1 discloses a monitoring device for automated printing plate changers. This device is a sensor coupled to the control system of the printing machine or the printing plate changing system. The device operates by detecting the rotation of the back-pressure roller in conjunction with the transport roller.

Disclosed in U.S. Pat. No. 5,634,406 (and corresponding German Patent DE 4 439 632 A1) is a method for automatically feeding a printing plate to the plate cylinder of a printing machine. According to the method, the printing plate is advanced by a plate conveyor towards a clamping rail on the plate cylinder. Position sensors are used to determine if the printing plate is properly aligned at two independent sites. If the printing plate is misaligned at either site or both sites, the printing plate is released and the process is repeated. Once the printing plate is aligned, the plate is finally mounted on the plate cylinder. A method and device for controlling the required sequence of steps in this method is disclosed in U.S. Pat. No. 5,479,859 (and corresponding German Patent DE 4 338 664 C2).

In general, sheet-fed offset printing machines, particularly sheet-fed offset printing machines which utilize printing plate changers and methods as described above, include a human-machine interface or control console. The human-machine interface, which is used to input data, control the system, and monitor the plate change process, is comprised of an input device and a display device in the form of a monitor. Through the human-machine interface, it is possible to display signals and measured values of the current print job and at the same time enter data and settings required for the next print job.

The prior art listed above describes the methods and devices for controlling an automated printing plate change process. These methods and devices relate to the change process as a whole or describe specific individual steps of the change process. The prior art, however, does not allow the operator to view, through a visual display device, the sequence of operations executed during the automated printing plate change process. Nor does the prior art detect and display where in the printing machine, and in which printing unit in particular, a fault occurred during the plate change process. The prior art further does not identify what type of fault occurred during the plate change process. The prior art simply monitors only one part of a very complex change process which involves a large number of individual steps.

SUMMARY OF THE INVENTION

The present invention is directed to a system for controlling the automated printing plate change process in an offset printing machine. The general objective of the present invention is to provide a system for programming a printing unit for an automated printing plate change and monitoring the sequence of events involved in the automated printing plate change process. It is a feature of the present invention to provide a human-machine interface computer and an input device for an operator to program printing units for a printing plate change. It is a further feature of the present invention to provide a visual display device for an operator to monitor the printing plate change process as it occurs.

In this respect, the system utilizes a graphical user interface to depict a printing machine during the automated printing process. Icons or symbols are used to represent individual printing units in the printing machine. As the printing process progresses, the icons change to represent the individual working steps or different stages of the automated printing plate change process. In the preferred embodiment of the invention, an individual printer unit icon changes to reflect each of the following stages: (a) inclusion of a printing plate on the printing cylinder of a printing unit; (b) activation of a printing plate change in a printing unit; (c) reverse rotation of the plate cylinder (conveying a printing plate from the print cylinder to a storage chamber or magazine); (d) disengagement of the printing plate from the register pins; (e) completion of the reverse rotation process; (f) forward rotation of the plate cylinder (conveying a new printing plate from a magazine onto the plate cylinder); (g) engagement of the printing plate with the register pins; (h) clamping of the printing plate; (i) completion of the printing plate change process.

It is another objective of the invention to provide a system for displaying the location of a fault when one occurs during the automated printing plate change process. Through interrogation of position sensors, the plate change process is monitored by the control system. When a fault occurs, such as a misalignment of the printing plate, it is possible to determine the location and type of fault. It is a feature of the invention to display the location of the fault by changing the graphical user interface icon of the printing unit in which the fault occurred. Similarly, it is another objective of the invention to provide a system for displaying the type of fault which occurred during the automated printing plate change process. It is a feature of the invention, therefore, to change the graphical user interface icon to reflect the type of fault.

In another feature of the invention, the graphical user interface displays icons in a window representing the print job currently running and at the same time visually displays in a separate window icons for the next print job. It is also a feature of the invention to display on the same visual display device several print jobs in different windows and to allow the operator to pre-program the printing units for a printing plate change in future print jobs.

Other features and advantages of the invention will be more readily apparent from the following detailed description of the preferred embodiment of the invention when taken in conjunction with the accompanying drawings wherein:

DETAILED DESCRIPTION OF THE PREFERRED EMBODIMENTS

Figure 1:
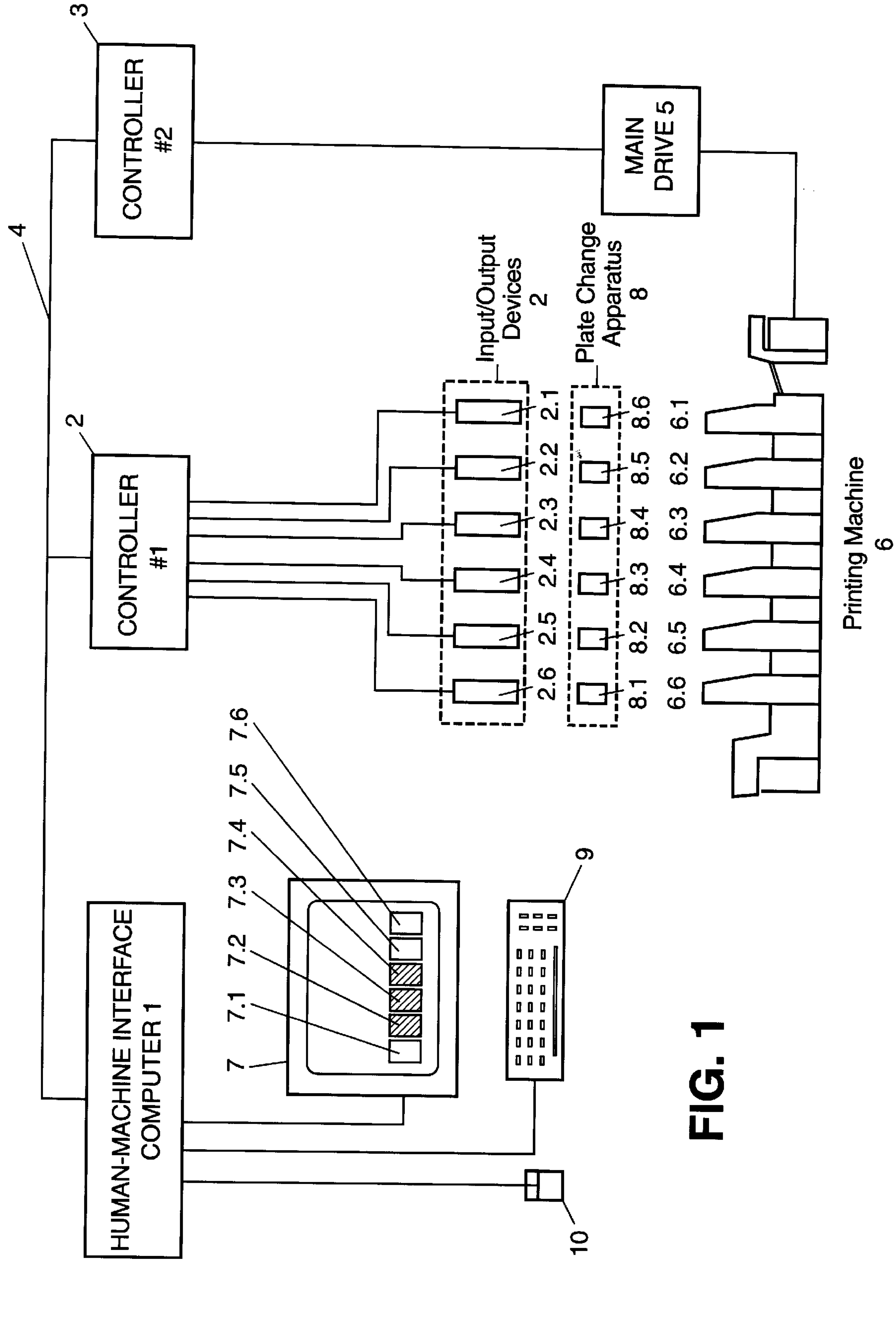
FIG. 1 is a diagrammatic representation of a control system for controlling an automated printing plate changer in an offset printing machine.
Figure 2:
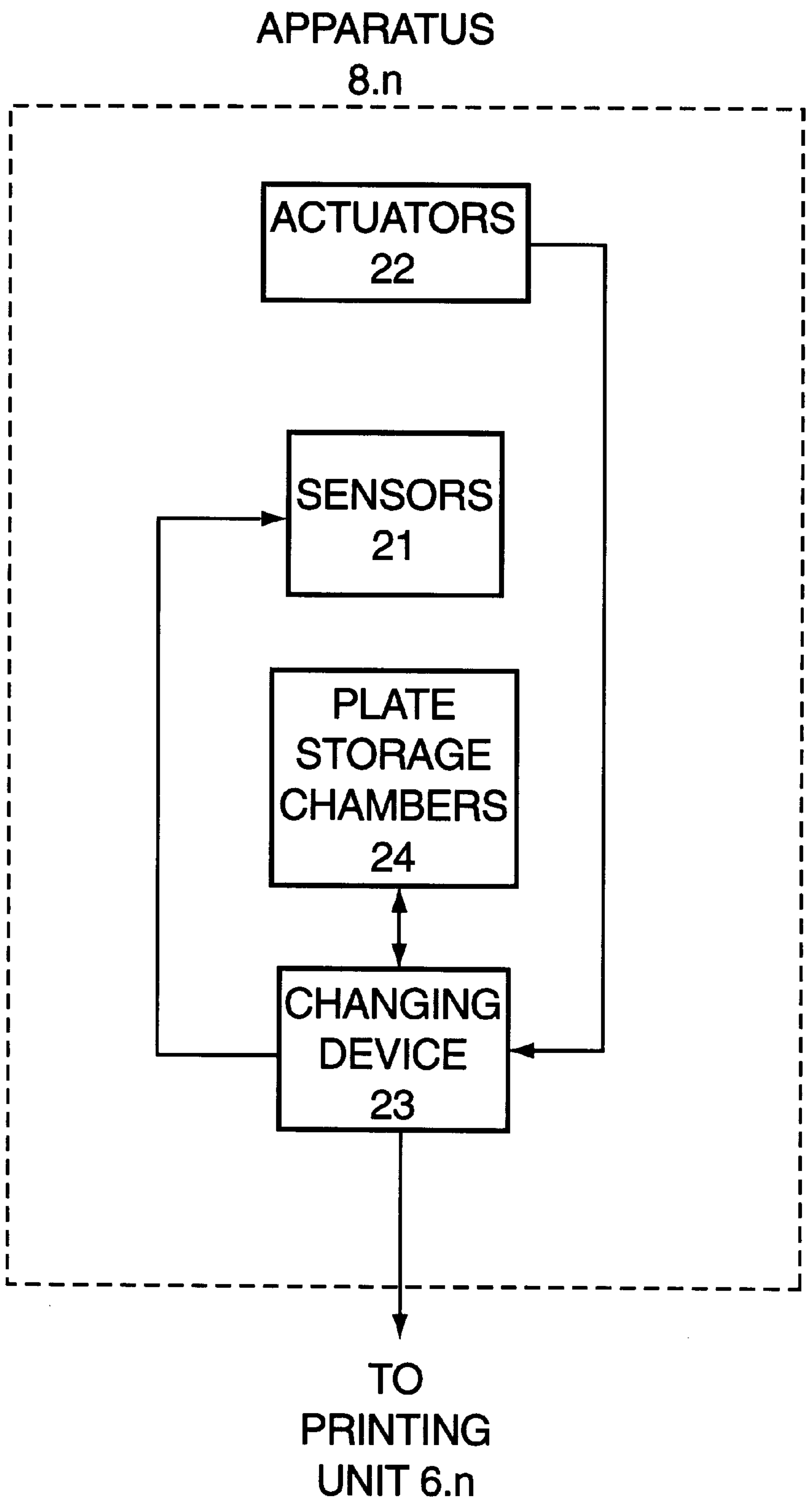
FIG. 2 is a block diagram of an apparatus for controlling the automated changing of printing plates in printing machines.

Turning to the drawings and referring first to FIG. 1, an embodiment of a system according to the present invention for controlling the changing of printing plates in an offset printing machine 6 is shown. The printing machine 6 has a total of six printing units 6.1–6.6 constructed in series. Each printing unit 6.1–6.6 includes an apparatus 8.1–8.6 for implementing the automated printing plate change process. An exemplary method and apparatus for controlling the automated changing of printing plates in a printing machine is disclosed in U.S. Pat. No. 5,479,859, assigned to the same assignee as the present invention and incorporated by reference herein. The apparatus comprises all the means for guiding a printing plate from a plate cylinder into a storage chamber or magazine and for guiding a printing plate from a storage chamber or magazine onto a plate cylinder. As shown in FIG. 2, the apparatus comprises interrogatable position sensors 21, actuator controls 22, printing plate storage chambers 23, and a changing device 24. An exemplary method and apparatus for automatically changing a printing plate is disclosed in U.S. Pat. No. 5,111,744, which is also hereby incorporated by reference.

Returning to FIG. 1, the printing machine 6 is coupled to a controller 2 of conventional microprocessor or microcontroller architecture. The controller 2 is connected via a computer network 4 to another controller 3 which is coupled to the main drive 5 of the printing machine 6. When the controller 2 sends a command to position the printing machine 6, the controller 3 in conjunction with an angle encoder, not depicted, generates a signal which is forwarded to the main drive 5. The main drive 5 then positions the specific plate cylinder, not depicted, in the individual printing units 6.1–6.6.

Figure 3:
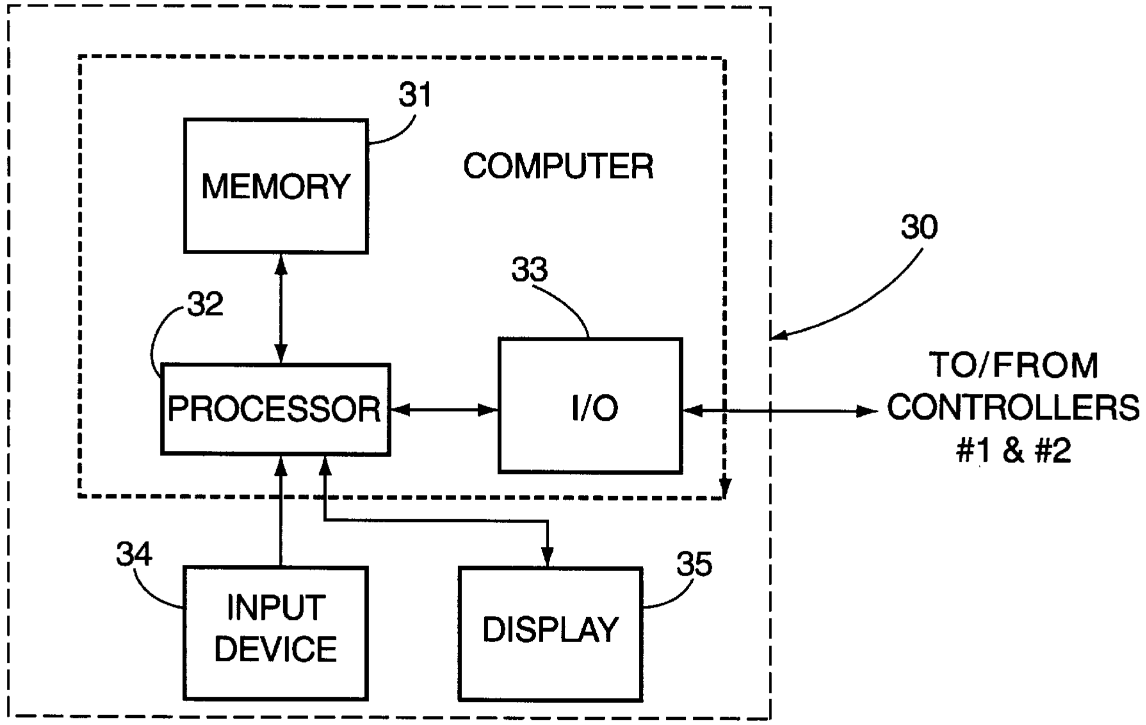
FIG. 3 is a block diagram of a human-machine interface computer.
Figure 4:
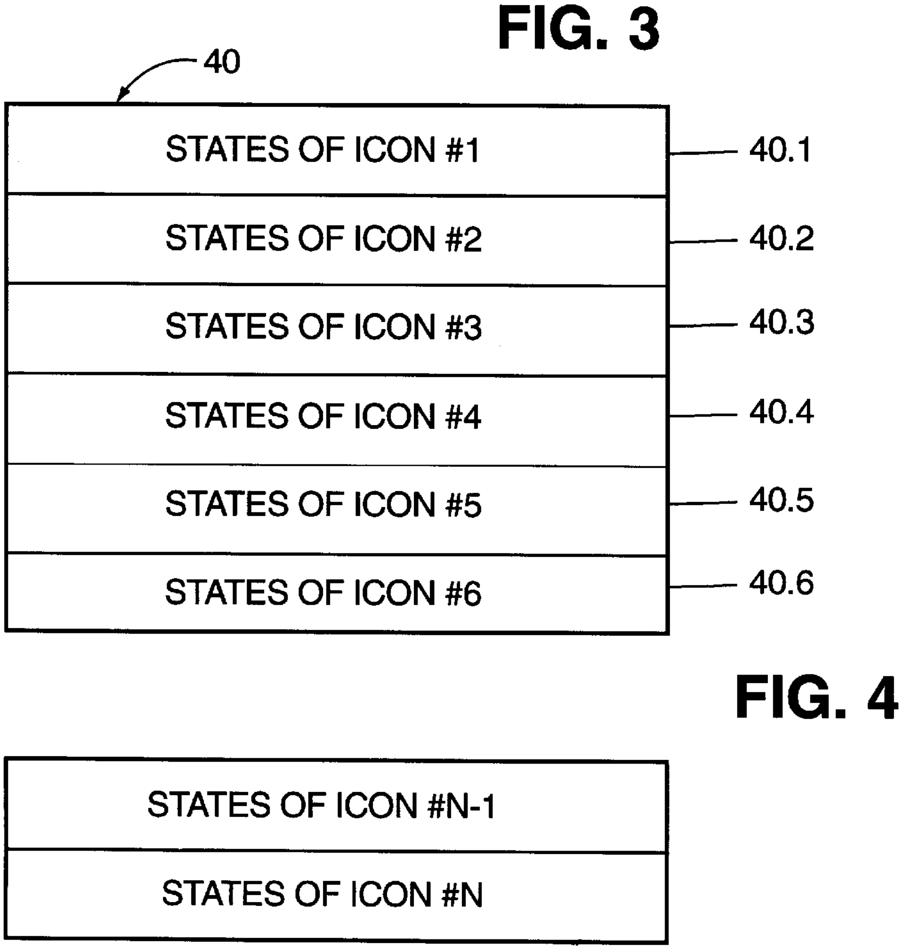
FIG. 4 is a block diagram of a memory for the human-machine interface computer.

The controller 2 is also connected to a human-machine interface computer 1 via a computer network 4. As shown in FIG. 3, the exemplary human-machine interface computer 30 comprises a processor 32, memory 31, interface circuitry 33, an input device 34, and a visual display device 35. The input device 34 is connected to the processor 32 and comprises the means to input relevant user commands, such as selecting and deselecting printing units. In the preferred embodiment, the input device 34 is a keyboard 9 and/or mouse 10 (as shown in FIG. 1). Once received, the input data is stored in the computer memory 31. The visual display device 35 is also connected to the processor 32 and comprises the means for displaying data and control system information. In the preferred embodiment, the visual display device 35 is a computer monitor 7 (as shown in FIG. 1). The memory 31 comprises the software and data structure 40 (as shown in FIG. 4) necessary to display the graphical user interface icons 7.1–7.6 (as shown in FIG. 1) described below. The processor 32 processes the input data and outputs instructions to the interface circuitry 33. The interface circuitry 33 comprises all the circuits for the communication of information and commands between the human-machine interface computer 1 and the controller 2 (as shown in FIG. 1).

Returning to FIG. 1, the system in general allows an operator monitoring the printing process on the computer monitor 7 to program printing units 6.1–6.6 for a printing plate change. In particular, graphical user interface icons 7.1–7.6 on the computer monitor 7 represent the individual printing units 6.1–6.6. The operator can program printing units 6.1–6.6 for a plate change by making selections through the input device. After selections are made, the icons 7.1–7.6, representing the printing units 6.1–6.6 scheduled for a printing plate change, are altered to indicate preselection. During the plate change process, the icons 7.1–7.6 are further altered to reflect the working steps of the process. During the plate change process, the icons 7.1–7.6 are stored in the memory 31 of the human-interface computer 30. As shown in FIG. 4, the memory contains a data structure for an icon representing each of the different states of the operating conditions 40.1–40.6. These icons are appropriately retrieved by the processor and displayed on the visual display device.

Figure 5:
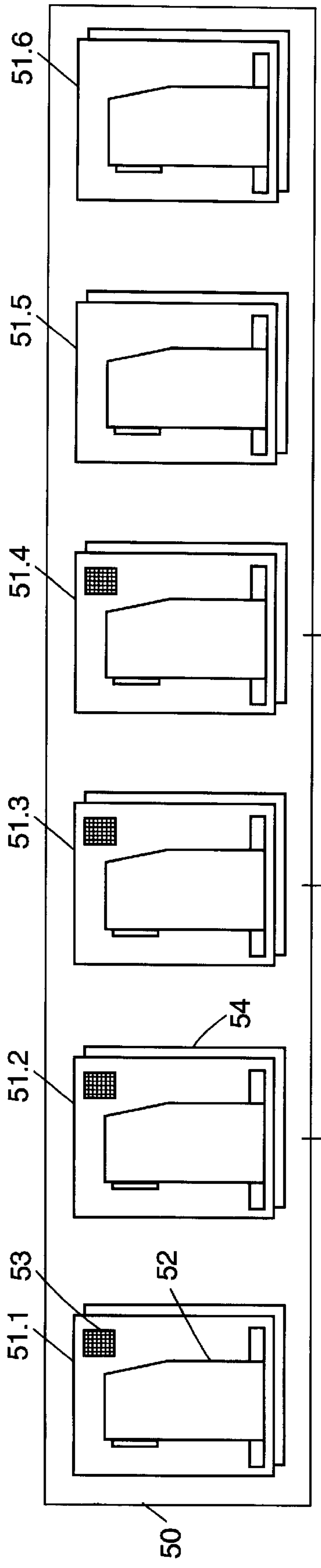
FIG. 5 illustrates, generally, the preferred manner for displaying the individual printing units of a printing machine and, specifically, the inclusion of a printing plate on the printing cylinder of a printing unit.

FIG. 5 shows generally the preferred manner for displaying a printing machine and the individual printing units of the printing machine. In a window 50, a printing machine is depicted by displaying all the printing units of the printing machine. In the exemplary embodiment illustrated in FIG. 5, there are six printing units 51.1–51.6 in the printing machine. Each individual printing unit 6.1–6.6 (as shown in FIG. 1) is represented by a printing unit icon 51.1–51.6. A printing unit icon 51.1 can be described as a rectangle surrounding a front view drawing of a printing unit tower 52. The square grid 53 in the upper right hand corner of the printing unit icon 51.1 indicates that the printing unit currently holds a printing plate. In FIG. 5, the first four printing units hold printing plates whereas the last two printing units do not hold printing plates.

Figure 6:
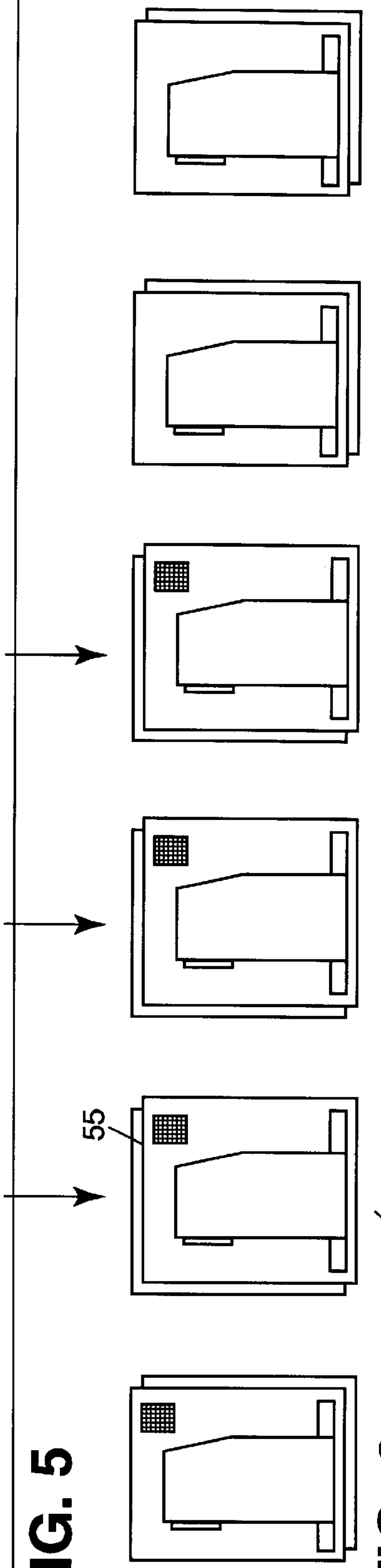
FIG. 6 illustrates the preferred manner for displaying the activation of a printing plate change in a printing unit.

From the human-machine interface computer 1, an operator can schedule a printing unit for a printing plate change. Procedurally, an operator selects, through the input device 34, a printing unit icon 51.1–51.6. The icons selected represent the printing unit 6.1–6.6 requiring a printing plate change. In FIG. 5, the line drawn and area shaded on the bottom and right side 54 of the printing unit icon 51.2 indicates that the printing unit is not programmed for a printing plate change. As shown in FIG. 6, three printing units, the second, third, and fourth, are programmed for a printing plate change. The scheduling of these three printing units is made recognizable by a prominent change to the printing unit icon 51.2. As illustrated, the line drawn and area shaded moves from the bottom and right side 54 of the printing unit icon 51.2 to the top and left side 55. Shading of an icon, on the bottom and right side or top and left side, is a conventional manner for depicting selection and deselection of an icon.

Figure 7:
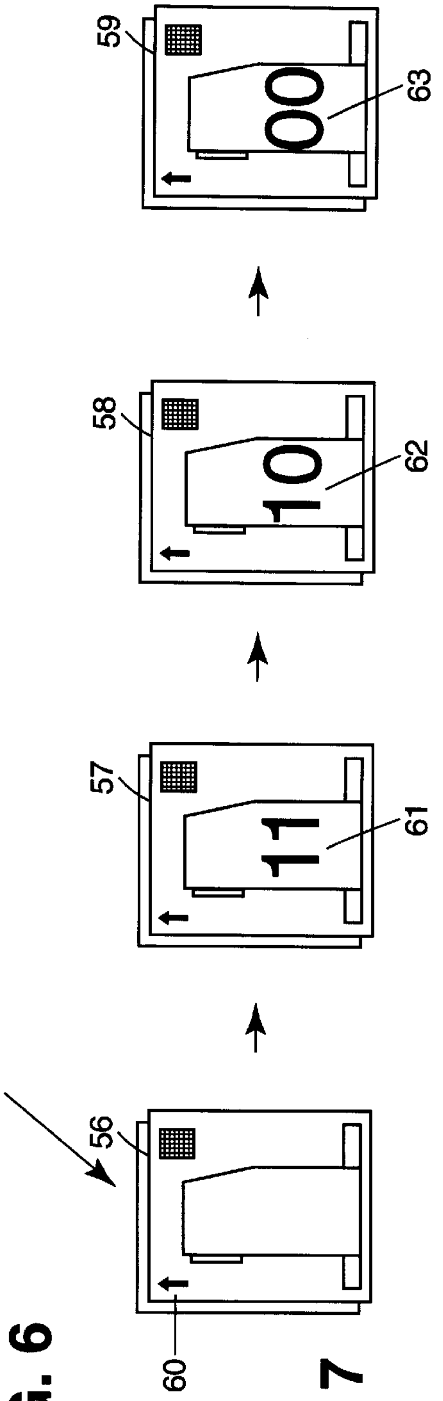
FIG. 7 illustrates the preferred manner for displaying the reverse rotation of the plate cylinder (conveying a printing plate from the print cylinder to a storage chamber or magazine), disengagement of the printing plate from the register pins, and completion of the reverse rotation process.

Once the printing unit has been programmed for a printing plate change, the actual plate change process is controlled by the controller 2. The working steps of the plate change process are simultaneously implemented by the controller 2 and displayed on the computer monitor 7. FIG. 7 illustrates the series of steps involved in changing the printing plate in one printing unit. The first printing unit icon 56 depicts the reverse rotation of the printing plate. Specifically, the up arrow 60 in the upper left corner indicates that the printing plate currently in the printing unit is being removed from the plate cylinder. Before the printing plate is guided from the plate cylinder, however, the plate must be removed from a set of register pins. Through the use of interrogatable position sensors, the closed/open state of the conductive path between the register pins and the plate can be determined. The second printing unit icon 57 in FIG. 7 depicts the state of removal from the register pins. A signal of “11” 61 in the printing unit icon 57, indicates that the printing plate is still completely resting on the register pins and that neither side of the register pins has been separated from the printing plate. In the third printing unit icon 58, the signal changes from “11” to “10” 62 indicating that the printing plate has separated from one side of the register pins. Finally, in the fourth printing unit icon 59, the signal changes from “10” to “00” 63 indicating that the printing plate is completely separated from the register pins.

Figure 8:
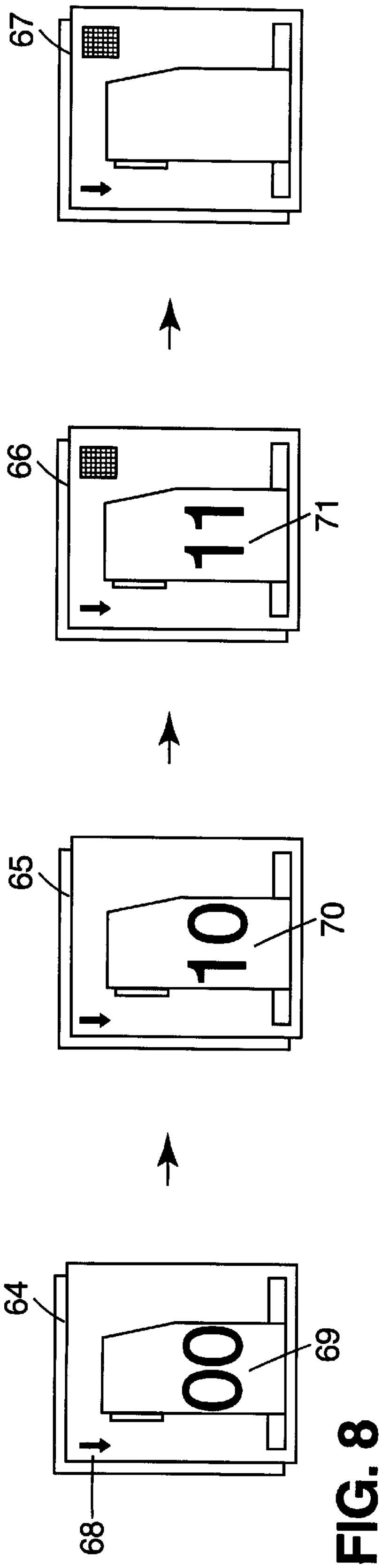
FIG. 8 illustrates the preferred manner for displaying the forward rotation of the plate cylinder (conveying a new printing plate from the magazine onto the plate cylinder), engagement of the printing plate with the register pins, and clamping of the printing plate.

After the old printing plate is conveyed out of the printing cylinder, the new printing plate is fed to the printing cylinder. FIG. 8 illustrates the series of steps involved in feeding the new printing plate to the printing cylinder. The first printing unit icon 64 depicts the forward rotation of the printing plate. Specifically, the down arrow 68 in the upper left corner means the printing plate change process is currently at the stage where a new printing plate is being forwarded to the plate cylinder. The signal “00” 69 indicates that the printing plate has been conveyed into the tension bar, but the plate has not made contact with either set of register pins. In the second printing unit icon 65, the signal changes to “10” 70 indicating that the printing plate has made contact with one side of the pins. In the third printing unit icon 66, the signal changes to “11” indicating that the printing plate is resting correctly on both sides of the register pins. Finally, the fourth printing unit icon 67 indicates that the printing plate is being clamped and drawn up around the circumference of the plate cylinder.

Figure 9:
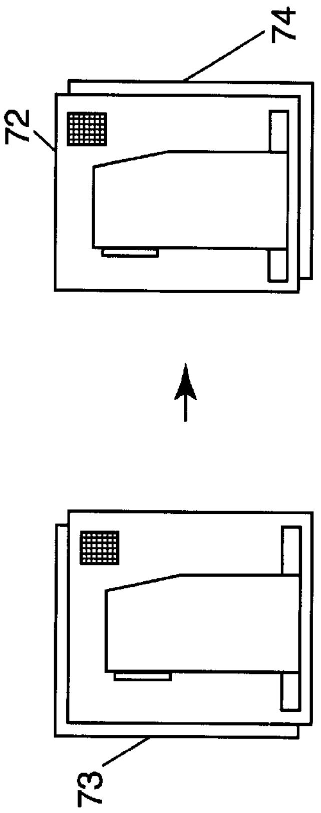
FIG. 9 illustrates the preferred manner for displaying deactivation or completion of the printing plate change process.

Once the previous steps are executed as shown in FIGS. 1–5, the printing plate change process is complete for the corresponding printing unit. FIG. 9, therefore, depicts the deselection or deactivation of the printing unit. The deselection of a printing unit is made recognizable by a prominent change to the icon 72. As illustrated, the line drawn and area shaded moves from the top and left side 73 of the printing unit icon to the bottom and right side 74. The deselection indicates that the printing plate change process was successful for that particular printing unit. The execution of the change process for the other printing units follows the same sequence as illustrated in FIGS. 4–6 and is similarly displayed on the computer monitor 7.

Figure 10:
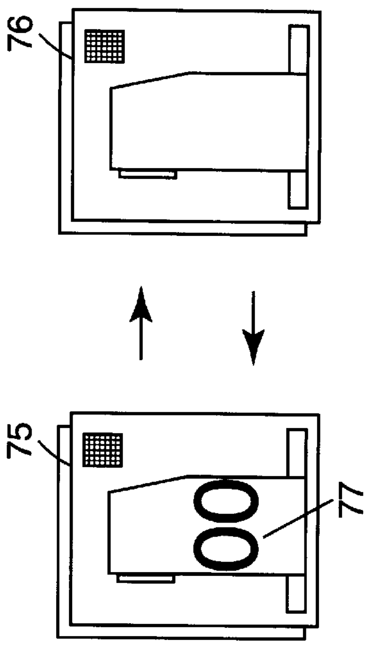
FIG. 10 illustrates the preferred manner for displaying a reverse rotation or forward rotation fault.

Finally, FIGS. 7 and 8 illustrate fault icons for the printing plate change process. FIG. 10 illustrates a reverse rotation or forward rotation fault. The printing unit icon switches between the printing unit icon 75 on the left and the printing unit icon 76 on the right. Effectively, this creates a flashing of the signal “00” 77. This flashing indicates to the operator that conveying of the printing plate away or to the printing cylinder caused a fault. To correct the fault, the printing plate must be manually removed or fed to the cylinder.

Figure 11:
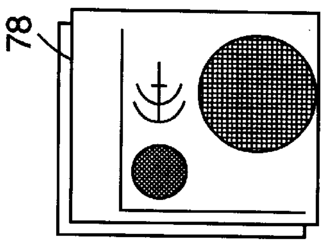
FIG. 11 illustrates the preferred manner for displaying a time overrun fault.

FIG. 11 illustrates the icon 78 for a “time overrun” fault. This fault occurs during the time that the printing plate is being conveyed out of the cylinder and while the position sensors are being interrogated. In particular, this fault is generated if an electrical state interrogation does not occur within a predefined time frame. One reason a “time overrun” fault may occur is that the printing plate was conveyed for a specific time, yet the position sensors do not signal successful completion of the process. This fault must similarly be manually corrected. After either fault is corrected manually, the operator acknowledges the correction by an input to the system and the automated printing plate change process continues through to completion.

Although the invention has been described in connection with certain embodiments, there is no intent to in any way limit the invention to those embodiments. On the contrary, the intent is to cover all alternatives, modifications, and equivalents included within the spirit and scope of the invention as defined by the appended claims.

We claim:

1. A system for monitoring and controlling an automated changing of printing plates in a printing machine, the printing machine having an apparatus for changing the printing plates, the system comprising: a series of sensors for sensing operating conditions of the apparatus, a series of actuators for controlling the apparatus, and a controller in communication with the sensors and the actuators for controlling the apparatus and generating information in response to the sensors describing the operating condition of the apparatus; and a processor responsive to the information from the controller and in communication with a visual display device having a graphical user interface for communicating to a user of the system a present operating condition of the apparatus; the graphical user interface including icons depicting different states of the operating conditions of the apparatus for changing the printing plate, including locations and types of faults occurring during the changing of the printing plate, and, a memory containing a data structure for an icon representing each of the different states of the operating conditions, which are retrieved by the processor for presentation on the user interface.

2. The system defined in claim 1, wherein the processor is a human-machine interface computer communicatively coupled to receive the information from the controller via a computer network.

3. The system defined in claim 1, wherein the processor receives the information from the controller and generates an output signal for displaying the icons depicting the present state of the operating conditions.

4. The system defined in claim 1, wherein the visual display device is a computer monitor responsive to the output signal from the processor.

5. The system defined in claim 1, wherein the processor receives input from the user commanding a printing plate change in a printing unit through selection of the icon representing the printing unit.

6. The system defined in claim 1, wherein the icons are selected through an input device communicatively coupled to send commands to the processor.

7. The system defined in claim 1, wherein the icons are displayed in a graphical user interface window.

8. The system defined in claim 7, wherein the graphical user interface window of a current print process is displayed simultaneously on the same visual display device as the graphical user interface window of a future print process.

9.The system defined in claim 8, wherein the processor receives input from the user commanding a printing plate change for the future print process through selection of the icon from the window representing the future print process.

* * * * *